United States Patent Office 3,090,689
Patented May 21, 1963

3,090,689
AQUEOUS VINYL ACETATE POLYMER EMULSION CONTAINING N-n-BUTYLBENZAMIDE AND FOOD PRODUCT COATED WITH SAME
Pierre Amedee Tillet, Lyon, France, assignor to Societe des Usines Chimiques Rhone-Poulenc, Paris, France, a corporation of France
No Drawing. Filed Feb. 4, 1960, Ser. No. 6,641
Claims priority, application France Feb. 6, 1959
8 Claims. (Cl. 99—166)

This invention relates to the protection of food products and more particularly to compositions for application to food products, such as cheese, to serve as protection against fungal attack.

It is known that food products are a ready prey to fungi, more especially *Mucor mucedo, Torula nigra, Saccharomyces rubber, Oidium lactis, Oidium aurantiacum, Asperigillus niger, Rhizopus nigricans, Penicillium italicum,* and *Penicillium glaucum.*

Various means have been employed to protect food products against the action of these fungi. A method which has been employed in the case of certain food products, more especially cheese, consists in forming a protective film on the product by applying to the products aqueous emulsions of film-forming polymers containing physiologically non-toxic plasticisers and fungicides. There have been proposed, as plasticizers for this purpose, triacetin, tributyl acetyl citrate, butyl stearate, dibutyl adipate, dibutyl sebacate and 2-ethylhexyldiphenyl phosphate. The fungicides used are preferably those which are commonly employed in the foodstuffs industry, for example sorbic acid.

According to a first feature of the invention there is provided a composition for application to food products to form a film thereon serving as protection against fungal attack, which comprises an aqueous polymer emulsion which contains N-n-butylbenzamide.

According to a further feature of the invention there is provided a method of producing a protective coating on food products which comprises applying thereto a coating of a composition as just set forth and drying the composition to form a film over the food product.

Suitable aqueous emulsions of polymers may be obtained by known emulsion polymerisation methods, which may be carried out in the presence of protective colloids which are physiologically innocuous, such as gelatin or polyvinyl alcohol. Aqueous emulsions of polymer may also be prepared from polymers of another physical form by known means, such as crushing and dispersion of the crushed material in water or by precipitation in the presence of protective colloids, from organic solutions by the addition of water.

All homopolymers and copolymers which are known for use in the food industry for the coating of food products may be employed in the present invention. Of these polymers, vinyl polymers are preferred, polyvinyl acetate and vinyl chloride-vinyl acetate copolymers being particularly suitable. The N-n-butylbenzamide has a plasticising action on such polymers but if desired the compositions may contain other plasticisers, e.g. any of those listed above.

In order to form satisfactory coatings on food products, the emulsions must have an appropriate consistency, which can readily be determined by preliminary test. The desired consistency can be obtained either by diluting commercial aqueous emulsions of polymers with water or by thickening them with non-injurious products such as sodium cellulose glycolate, sodium polyacrylate or methyl cellulose.

The quantity of N-n-butylbenzamide in the aqueous emulsions of polymers will vary with the precise use to which the composition is to be put. A proportion of from 10% to 20% calculated on the weight of dry polymer is generally suitable.

The aqueous emulsion compositions of the present invention may be used for coating food products by any known method of applying a film coating to a product, for example by dipping the product in the emulsion or by spraying the product with the emulsion, in either case followed by drying the coating thus applied. In this way there may be obtained clear, transparent, glossy film coatings which are sufficiently adhesive to the products but can be peeled off when required. Such film coatings remain flexible and have remarkably good resistance to the action of moulds, even after prolonged storage.

The aqueous emulsion compositions of the invention are particularly suitable for use in applying a protective coating to cheese of the "melted" or "pressed" type. However, they may also be used to pack meat products, such as sausages and ham and other food products such as bread, fruit, e.g. citrus fruits, apples, pears and bananas.

Various adjuvants such as loading agents, colouring agents and pigments, may be included in the aqueous emulsion compositions of the present invention if desired.

The following examples will serve to illustrate the invention.

*Example I*

Cheeses of the pressed type were dipped into an aqueous emulsion having the following composition:

| | Percent |
|---|---|
| 50% aqueous polyvinyl acetate emulsion | 85 |
| N-n-butylbenzamide | 15 | drained and allowed to dry. There was thus obtained on the cheeses a flexible, clear coating. The cheeses thus coated were found to keep for several weeks without any attack by fungi under conditions in which uncoated cheeses were rapidly covered with mould.

*Example II*

Cheese coatings were prepared by the process described in Example I, but using an aqueous emulsion having the following composition:

| | Percent |
|---|---|
| 60% aqueous vinyl chloride-vinyl acetate copolymer emulsion containing 85% of vinyl chloride | 85 |
| N-n-butylbenzamide | 15 |

The coatings obtained were similarly effective in the prevention of fungal attack.

I claim:
1. A composition for application to food products to form a peelable self-supporting film thereon serving as protection against fungal attack which comprises an aqueous emulsion of a polymer selected from the class consisting of polyvinyl acetate and copolymers of vinyl acetate and vinyl chloride which contains N-n-butylbenzamide.

2. A composition for application to food products to form a pellable self-supporting film thereon serving as protection against fungal attack which comprises an aqueous emulsion of a polymer selected from the class consisting of polyvinyl acetate and copolymers of vinyl acetate and vinyl chloride which contains N-n-butylbenzamide in a proportion of 10 to 20% by weight of the dry weight of the polymer.

3. A composition for application to food products to form a peelable self-supporting film thereon serving as protection against fungal attack which comprises an aqueous polyvinyl acetate emulsion which contains N-n-butylbenzamide.

4. A composition for application to food products to form a peelable self-supporting film thereon serving as protection against fungal attack which comprises an aqueous emulsion of a copolymer of vinyl chloride and vinyl acetate which contains N-n-butylbenzamide.

5. A composition for application to food products to form a pellable self-supporting film thereon serving as protection against fungal attack which comprises an aqueous polyvinyl acetate emulsion which contains N-n-butylbenzamide in a proportion of 10 to 20% by weight of the dry weight of the polymer.

6. A composition for application to food products to form a peelable self-supporting film thereon serving as protection against fungal attack which comprises an aqueous emulsion of a copolymer of vinyl chloride and vinyl acetate which contains N-n-butylbenzamide in a proportion of 10 to 20% by weight of the dry weight of the polymer.

7. A method of producing a protective coating on food products which comprises applying thereto a coating of an aqueous emulsion of a polymer selected from the class consisting of polyvinyl acetate and copolymers of vinyl acetate and vinyl chloride which contains N-n-butylbenzamide and drying the composition to form a film over the food product.

8. A method of producing a protective coating on cheese which comprises applying thereto a coating of an aqueous emulsion of a polymer selected from the class consisting of polyvinyl acetate and copolymers of vinyl acetate and vinyl chloride which contains N-n-butylbenzamide and drying the composition to form a film over the cheese.

References Cited in the file of this patent
UNITED STATES PATENTS

| | | |
|---|---|---|
| 2,416,522 | Gertler et al. | Feb. 25, 1947 |
| 2,530,852 | Bixby | Nov. 21, 1950 |
| 2,835,595 | Salatiello | May 20, 1958 |
| 2,961,322 | Winterberg | Nov. 22, 1960 |
| 2,975,067 | Winterberg | Mar. 14, 1961 |